United States Patent [19]

Harigai

[11] Patent Number: 5,250,895
[45] Date of Patent: Oct. 5, 1993

[54] METHOD OF ACCELERATION TESTING OF RELIABILITY OF LSI

[75] Inventor: Hisao Harigai, Tokyo, Japan

[73] Assignee: NEC Corporation, Tokyo, Japan

[21] Appl. No.: 823,785

[22] Filed: Jan. 23, 1992

[30] Foreign Application Priority Data

Jan. 23, 1991 [JP] Japan .................. 3-006311

[51] Int. Cl.$^5$ ............................................. G01R 31/00
[52] U.S. Cl. .............................. 324/158 R; 324/73.1
[58] Field of Search ...................... 324/158 R, 73.1; 371/15.1, 22.5, 20.1, 22.6; 437/8

[56] References Cited

U.S. PATENT DOCUMENTS 4,862,071  8/1989  Sato et al. ................... 324/158 R
4,949,033  8/1990  Kono et al. .................. 324/158 R Primary Examiner—Vinh Nguyen
Attorney, Agent, or Firm—Whitham & Marhoefer

[57] ABSTRACT

A method of acceleration testing of reliability of an LSI adopting a microprogram is realized simply. In a test mode, a microaddress is progressively incremented "1" by "1" and data processing within the LSI is executed in accordance with a microcode read out from a control memory based on the microaddress. As for a command decoder and an address generator, external data terminals are clamped to a voltage source or to a ground to permit a specific command to be fetched by the LSI under test. In this way, a majority of internal gates within the LSI are activated while the acceleration test is being conducted on the LSI.

4 Claims, 2 Drawing Sheets

METHOD OF ACCELERATION TESTING OF RELIABILITY OF LSI

BACKGROUND OF THE INVENTION (1) Field of the Invention:

The present invention relates to a method of testing LSIs and, more particularly, to an acceleration testing of the reliability of LSIs.

(2) Description of the related art:

An acceleration testing of the reliability of an LSI (hereinafter simply referred to as "acceleration testing") has for its purpose to cause early generation of an initial failure (i.e., fault) of an LSI by holding the LSI, under application of a high voltage (of 6 V, for instance, if the normal operation voltage of the LSI is 5 V), exposed to a high temperature environment for a long time. This high voltage and high temperature environment is referred to as an acceleration test environment. If a fault occurs in the acceleration test environment, it can be detected in a short period of time after the completion of the acceleration test by means of an LSI tester with the LSI being held in the normal environment.

Troubles may be classified into several types. In connection with the acceleration test, restorable faults and non-restorable faults are considered here. A restorable fault is reproducible only in a specific environment such as the acceleration test environment noted above. A non-restorable fault, occurring once, for instance, such fault as a breaking of wirings is reproducible not only in the environment noted above but also in a restored normal temperature environment.

For the acceleration test, a burn-in furnace is used, which is capable of controlling the setting of the acceleration test environment noted above. As the acceleration test, there are following three different kinds of tests with different operations of the LSI to be tested placed in the burn-in furnace:

Acceleration test (1), in which only a source voltage is supplied to the LSI under test;

Acceleration test (2), in which a source voltage and a clock signal are supplied to the LSI under test; and Acceleration test (3), in which other signals in addition to the source voltage and the clock signal are supplied to the LSI under test to operate the LSI as much as possible for the test.

The test (1) aims at an early generation of the non-restorable fault. In this test, however, it is impossible to control the internal gate states of the LSI under test because only a source voltage is supplied thereto. In other words, in this test the LSI under test does not operate logically. Therefore, the internal gates of the LSI are not activated (i.e., not inverted from "1" to "0" or from "0" to "1"). For example, therefore, if there is no potential difference between both the ends of a wiring which is about to be broken, no change in state occurs, and it is impossible to generate a fault of breaking of the wiring, which is a non-restorable fault.

The test (2) is one step ahead of the above test (1). In this test, a clock signal is also supplied to the LSI under test. Thus, a wiring for the clock signal and gates which receive directly the clock signal are activated to undergo equivalently normal operation, thus permitting the generation of a non-restorable fault at the above limited parts or components. However, a majority of gates are not activated and, therefore, the detection percentage is still low.

The test (3) aims at generating non-restorable faults in all internal parts of the LSI under test by activatedly operating a majority of gates in the LSI as in the normal operation. In one conceivable method of carrying out the test (3), applied to the testing of such an active LSI as a microprocessor, for operating the microprocessor or the like under test, a simple test system is produced using a memory and a TTL or like IC-LSI for memory access controlling. The whole test system is then set in a burn-in furnace and is operated by externally supplying to it a source voltage, a clock signal, a reset signal, etc. Thus, a majority of gates in the LSI under test are activated as in the normal operation to cause generation of non-restorable faults latent in all internal parts of the LSI. The test (3) is carried out similarly for testing a passive LSI such as a peripheral LSI for a microprocessor.

In another method of carrying out the test (3), a test like a selection test is carried out continuously on an LSI under the acceleration test environment by using an LSI tester.

As shown above, the prior art acceleration tests (1) and (2) are incapable of activating all the internal gates of the LSI under test and, therefore, provide for only low percentages of generation and detection of non-restorable faults.

The acceleration test (3) in the method of externally controlling a special test system containing an LSI under test, the system being set in a burn-in furnace, is not feasible because it is necessary to guarantee that the IC-LSI and other associated parts constituting the test system other than the LSI under test operate normally even under the acceleration test environment noted above and also because it is necessary to load programs in the memory of the test system from the outside of the burn-in furnace.

The method of carrying out the acceleration test (3) by using an LSI tester is nearly an ideal method. However, in this method an expensive LSI tester has to be used exclusively for long time (i.e., several to several ten hours for one acceleration test). In addition, the number of LSIs that can be tested simultaneously in one acceleration test is limited. Therefore, this method requires very high cost for conducting test.

SUMMARY OF THE INVENTION

It is, therefor, an object of the invention to overcome the problems existing in the conventional methods and to provide an improved method of acceleration test of reliability of LSIs.

It is another object of the invention to provide an LSI test method, which permits increasing the non-restorable fault generation percentage to reduce the percentage of the non-restorable fault generation in the field (or market) by permitting activation of a large number of internal gates in the LSI under the acceleration test as compared to that in the prior art test.

According to the present invention, there is provided a method of acceleration testing of reliability of an LSI adopting a microprogram control system, the LSI having a control memory, a microaddress controller for generating a microaddress and supplying it to the control memory, and an incrementer for receiving the microaddress and incrementing it by "1", the method comprises steps of:

placing the LSI in an acceleration testing apparatus wherein an acceleration test environment can be externally controlled:

switching an operation mode of the LSI placed in the acceleration testing apparatus between a test mode and a normal mode from the outside of the LSI;

clamping an input terminal through a resistor to a power source or to a ground;

supplying the LSI with a source voltage and with a clock signal and a reset signal from a signal generator outside the acceleration testing apparatus;

inputting an output of the incrementer to the microaddress controller; and selecting the output of the incrementer by the microaddress controller while the LSI is set at the test mode.

Further, the method of the present invention may further comprise a step of clamping data terminals of the LSI under test via resistors to the voltage source or to the ground so that the LSI fetches a specific command code while the acceleration test is being conducted.

Thus, according to the present invention it is possible to carry out an acceleration test (3) to generate latent non-restorable faults in all internal parts of the LSI under test by activatedly operating a majority of gates within the LSI in the same way as in the normal operation without setting such active test system as IC-LSI in a burn-in furnace or without need of exclusively using any LSI tester during the acceleration test.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

Now, preferred embodiments of the invention will be described with reference to the appended drawings.

Figure 1:
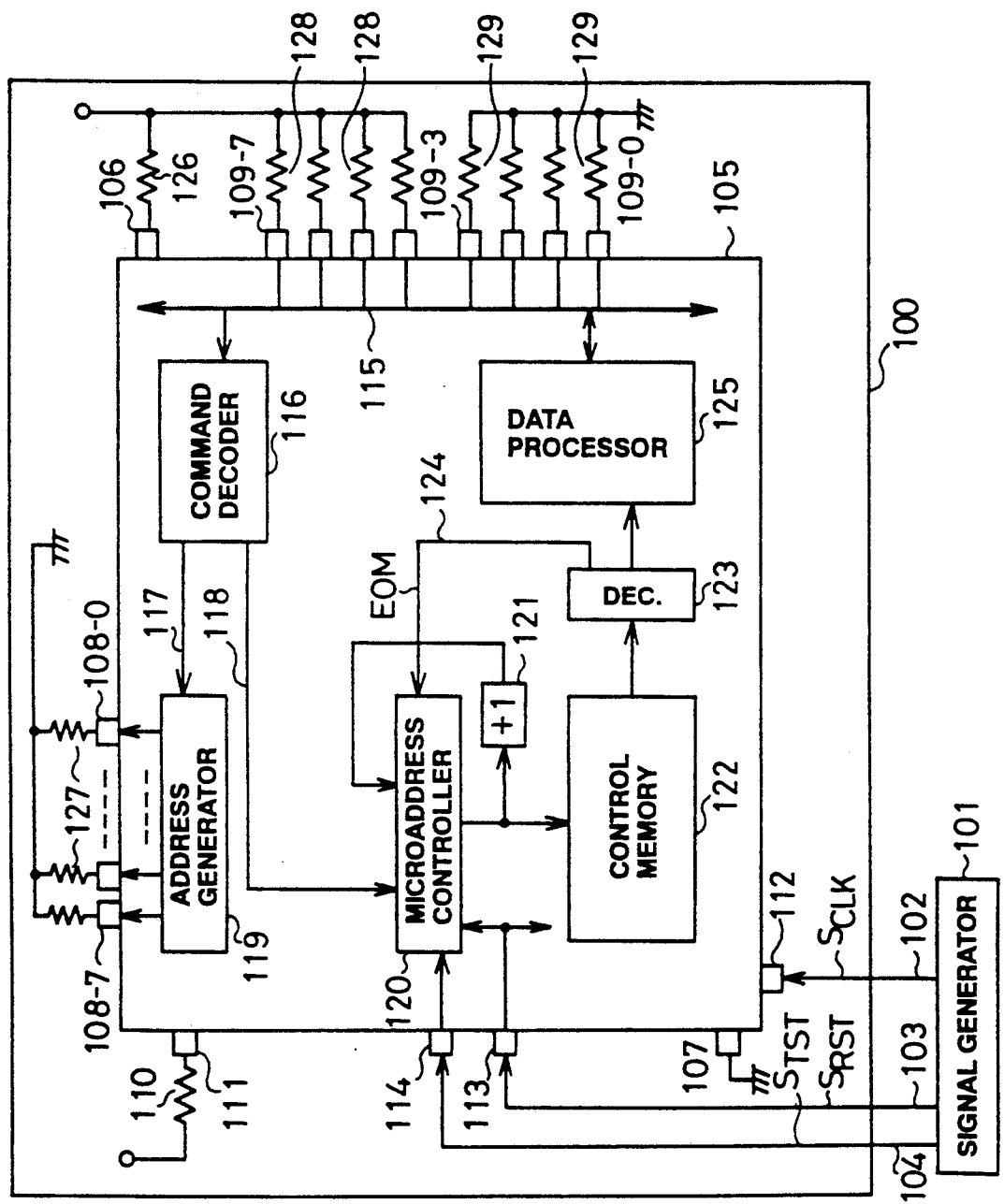
FIG. 1 is a block diagram showing an embodiment of the invention.

FIG. 1 shows one embodiment of the invention. Designated at 100 is an acceleration testing apparatus, for instance a burn-in furnace, and at 101 a signal generator for the acceleration testing apparatus, i.e., burn-in furnace 100. The signal generator 101 supplies, to an LSI to be tested disposed in the burn-in furnace 100, a clock signal $S_{CLK}$ via a signal line 102, a reset signal $S_{RST}$ via a signal line 103, and a test signal $S_{TST}$ via a signal line 104.

Designated at 105 is an LSI which is subjected to the acceleration test of the invention, i.e., a microprocessor in which microprogram control is conducted. Designated at 106 and 107 are a source voltage terminal and a grounding terminal, respectively, of the microprocessor 105. Designated at 108-7 through 108-0 are address output terminals of the microprocessor 105, for instance, the terminal 108-7 being for an address bit "7" and the terminal 108-0 being for an address bit "0". Designated at 109-7, 109-3 through 109-0 are data terminals, for instance, the terminal 109-7 being for a data bit "7", the terminal 109-3 being for a data bit "3" and the terminal 109-0 being for a data bit "0", respectively. Designated at 110 is a resistor, at 114 a test signal input terminal, and at 113 a reset signal input terminal. Designated at 112 is a clock signal input terminal, and at 111 an input terminal for other than the reset, clock and test signals, for instance, a bus hold request signal or an interrupt request signal which directly influences on the control of operations such as a microprogram process of procedure in the microprocessor 105. Designated at 115 is an internal bus, and at 116 is a command decoder for fetching commands from data terminals via an internal bus 115 and decoding these commands. When the command decoder 116 fetches FO(16), it decodes as a command code of an NOP (NO Operation) command. That is, the command code of the NOP command for the microprocessor 105 is FO(16). Designated at 117 and 118 are output signal lines from the command decoder 116. Designated at 119 is an address generator, which receives resultant data of command decoding in the command decoder 116 via the output signal line 117 and generates addresses for operand access and command fetch. Designated at 120 is a microaddress controller, and at 121 an incrementer. The microaddress controller 120 receives the output of the command decoder 116 via the output signal line 118, the output of the incrementer 121, the reset signal $S_{RST}$ and the test signal $S_{TST}$. Via the output signal line 118, the start address data or information of a microprogram corresponding to a command to be executed, as a result of command decoding in the command decoder 116, is transferred to the microaddress controller 120. The incrementer 121 receives the output of the microaddress controller 120 and then outputs the same output by incrementing by "1". Designated at 122 is a control storage or control memory, which outputs control codes corresponding to the microaddresses produced by and outputted from the microaddress controller 120. It may not be limited that all the microaddress space of the control memory 122 is actually provided on the semiconductor chip. If a microaddress which is not actually allotted or provided is inputted to the control memory 122, the control memory 122 provides a microcode of an MNOP (Microprogram NO Operation) command. Designated at 123 is a microdecoder for decoding control codes outputted from the control memory 122. Designated at 124 is one output of the microdecoder 123 called an EOM (End of Microprocedure) signal indicative of the end of a microprocedure. Designated at 125 is a data processor which is controlled by a signal generated as a result of decoding by the microdecoder 123 of control data provided from the control memory 122 under control of each clock pulse.

The disposal of the terminals of the LSI under the acceleration test will now be described.

The source voltage terminal 106 of the LSI under test is connected via a resistor 126 to a voltage source which is controlled by the acceleration testing apparatus. The terminal 108 is connected via the resistor 126 in order to protect the LSI under test from a surge voltage which often develops when connected to the power source and also to limit the supply current. When a large supply current flows to an LSI to be tested, it is necessary to determine the resistance value of the resistor 126 connected in series with the LSI from consideration of the voltage drop across the resistor 126. Mostly, the resistance value of the resistor 126 used is about several ohms. The grounding terminal 107 is directly connected to the ground which is controlled by the acceleration testing apparatus.

When carrying out an acceleration test on a CMOS device as an LSI under test, it is necessary to fix the input terminals to a low or a high level, i.e., to 0 V or the source voltage (for instance, 5 V). If the input terminal is left without being connected to the source voltage and to the ground, that is, left at an open state, it assumes a state equivalent to one with an applied voltage at an intermediate level (for instance, about 2 V with an LSI of CMOS level interface). When a signal of about 2 V is applied to the gates of p- and n-channel transistors of an input buffer, which receives a signal from that input terminal, both of the p- and n-channel transistors are not turned off together, thus causing through-current from the voltage source to the ground on the semiconductor chip. In such a case, a damage is caused to the input stage (i.e., the input buffer, wirings to output terminals, etc.) of the LSI under test. This through-current flows continuously for an acceleration test execution period which is as long as several to several hundred hours. This means that, in an acceleration test with an aim of generating an initial failure and rejecting the products with the initial failure before shipment for the purpose of shipping highly reliable products, excess stress is given to the input stage of the LSI in the course of the acceleration test. That is, the acceleration test itself is no longer meaningful. For this reason, the input terminal, particularly input terminals for signals other than the reset, clock and test signals in this embodiment, is connected via a resistor to the voltage source or connected directly to the ground from the consideration of the internal operation in the LSI under test during the acceleration test. The input signal is clamped to the source voltage via a resistor in order to protect the input stage (i.e., the input buffer and wirings to outer terminals) from a surge voltage which frequently develops when the terminal 106 is connected to the voltage source. The resistor for clamping the input signal to the source voltage is desirably several to several ten kiloohms. For example, if an interrupt request signal for the microprocessor 105 as an LSI under test is active at a high level, the interrupt request signal input terminal is directly connected to the ground and held inactive during the acceleration test. For example, if a signal inputted to the input terminal 111 is a bus hold request input signal for the microprocessor 105 and is active at a low level, the bus hold request signal input terminal (111) is clamped to the source voltage via a resistor 110 to hold it inactive during the acceleration test. To the test, reset and clock signal input terminals 114, 113 and 112 in this embodiment are inputted signals of voltage levels not remaining as an intermediate level from the signal generator 101 of the acceleration testing apparatus.

Even if the output terminals of the LSI under the acceleration test are held load-free, it has no adverse affects on the operation of the acceleration test. However, by connecting the address terminals as output terminals via resistors 127 to the ground as shown in FIG. 1, an acceleration test on the output buffers and wirings therefrom to the address output terminals, may be effected by connecting loads to the address output terminals and passing current to the output buffers when addresses are outputted. Other output terminals, like the address output terminals, are connected via resistors to the ground in order to protect the output stage (i.e., the output buffers and wirings therefrom to outer output terminals) from damages caused by the flow of excess currents. For example, when a high level signal is outputted from an output terminal which is connected via a resistor to the ground, the current is caused to flow through a current path, that is, from the outer source voltage terminal, the output buffer p-channel transistor on the semiconductor chip, the wiring on the chip, the pad, the output terminal, the external resistor and to the ground. This current is limited by the resistor to protect the output stage. The resistor 127 for clamping the output signal desirably has a resistance value of several to several ten kiloohms.

The input/output terminals of the LSI under the acceleration test, like the input terminals and the output terminals, are clamped via resistors to the voltage source or to the ground in order that no intermediate level voltages are inputted while they are operating as input terminals and that loads are connected when they are operating as output terminals. The resistance value of the resistors for clamping the input/output signals is desirably several to several ten kiloohms. In the microprocessor 105 as the LSI in this embodiment, data supplied to the data terminals 109-7 though 109-0 are input/output signals. In this embodiment, the data terminals 109-7 through 109-4 for bit "7" through bit "4" of data are clamped via resistors 128 to the voltage source, and the data terminals 109-3 through 109-0 for bit "3" to bit "0" of data are clamped via resistors 129 to the ground.

The operation immediately after the resetting of the microprocessor 105 will be described. When a high level signal having a sufficient duration is inputted as the reset signal $S_{RST}$ from the reset signal input terminal 113 to the microprocessor 105, the address generator 119 generates a predetermined address and outputs it from the address terminals 108-7 through 108-0 to outside. The command decoder 116 fetches a command corresponding to the address outputted from the address generator 119 immediately after the resetting and decodes the command so as to start the predetermined processing. The microaddress controller 120 generates a start address data of a micro-procedure (reset micro-procedure) for executing the processing at the time of resetting and forwards this data as microaddress to the control memory 122. At the end of a series of microprogram control in the reset micro-procedure, the EOM signal from the decoder 123 becomes active, and the microaddress controller 120 fetches the start address data of the next command to be executed from the command decoder 118 and produces a new microaddress forwarded to the control memory 122.

Now, the test mode of the LSI under test according to the invention will be described.

First, a high level test signal $S_{TST}$ is supplied from the signal generator 101 of the acceleration testing apparatus via the signal line 104 to the test signal input terminal 114. As this time, the microprocessor 105 as the LSI under test operates in the test mode. When a reset pulse $S_{RST}$ having a sufficient duration is inputted to the reset signal input terminal 113, the microaddress controller 120 outputs the start address of the reset micro-procedure as microaddress to the control memory 122. When the test signal 114 is at a high level, the microaddress controller 120 always selects the output of the incrementer 121 and outputs the microaddress to the control memory 122. That is, even if the EOM signal becomes active with the end of the reset micro-procedure, for instance, the microaddress controller 120 ignores the start address data from the command decoder 118. Thus, when the source voltage is supplied, a reset pulse $S_{RST}$ is inputted to the reset signal input terminal 113, a high level test signal $S_{TST}$ is inputted to the test signal input terminal 114, and a clock signal $S_{CLK}$ is inputted to the clock signal input terminal 112 from the signal generator 101, the microaddress controller 120 increments the microaddress "1" by "1" from the start address of the reset micro-procedure and outputs it to the control memory 122 while the test signal $S_{TST}$ is at the high level. At this time, it may occur that microaddresses not actually allotted in the control memory 122 are inputted to the control memory 122. In such a case, the control memory 122 outputs the MNOP microcode as noted above. In the test mode, the microprogram stored in the control memory 122 can all be executed, and thus the data processor 125 can execute all kinds of data processes or procedures of the microprocessor 105.

For example, with a 12-bit microaddress of the microprocessor 105, with 1 MHz clock signal $S_{CLK}$ inputted thereto and with one microcommand thereof executed in one clock pulse during the acceleration test, the microaddress is incremented "1" by "1" for each clock pulse. Thus, it takes 0.004 second for the output of all the microaddresses. Since the acceleration test usually takes several or more hours, during the acceleration test the internal process may be repeatedly executed to activate the internal gates of the microprocessor 105 as the LSI under test.

In the test mode, the command decoder 116 fetches the command codes externally applied from the data terminals. In this embodiment, the data terminals are clamped to the voltage source or to the ground as noted above, and FO(16) is fetched at all times. Accordingly, the command decoder 116 always decodes the NOP command and controls the address generator 119 to increment the address. Thus, in the test mode, the address generator can increment the address "1" by "1" from the reset address and provides addresses in the entire address space of the microprocessor 105. For instance, an address of the microprocessor 105 may be 16 bits, an external data bus may be 8 bits, a clock signal of 1 MHz may be inputted to the microprocessor 105 during the acceleration test, and the command fetch bus cycle of the microprocessor 105 may be 4 clock pulses.

In this embodiment, the data terminals are clamped to the voltage source or the ground as noted above. The microprocessor 105 thus fetches FO(16), i.e., the NOP command code, one for every 4 clock pulses. This means that the address is incremented by "1" for every 4 clocks, and thus it takes 2.6 seconds before all the 16-bit address is outputted. However, since the acceleration test usually takes several or more hours, it is possible to activate the address generator and the address terminal output stage of the microprocessor 105 as the LSI under test by repeating the address generation during the period of the acceleration test.

Figure 2:
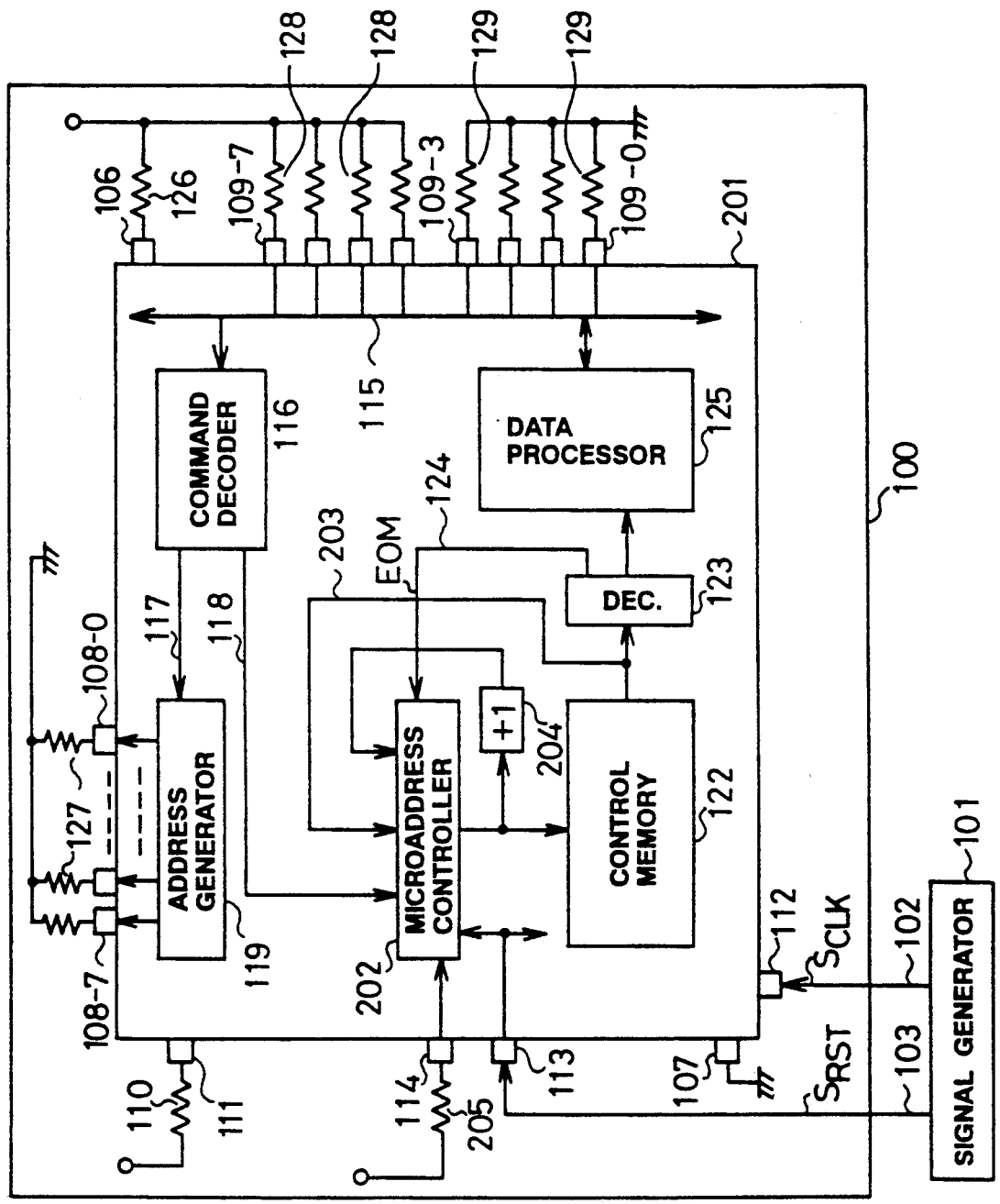
FIG. 2 is a block diagram showing another embodiment of the invention.

FIG. 2 shows another embodiment of the invention.

Designated at 201 is a microprocessor as an LSI under test, which adopts a microprogram control system of a next address system. Designated at 202 is a microaddress controller, at 205 a signal line for taking out next address data among microcodes read out from the control memory 122. Designated at 204 is an incrementer, which is newly provided in this embodiment in spite of the fact that the microprocessor 201 adopts the microprogram control system of the next address system. The incrementer 204 receives the address outputted from the microaddress controller 202 to the control memory 122 and outputs the microaddress after incrementation by "1" to the microaddress controller 202. The microaddress controller 202 receives the start address data from the command decoder 116, the output of the incrementer 204 and the next address data 203 among the microcodes read out from the control memory 122. The test signal input terminal 114 of the microprocessor 201 is clamped via a resistor 205 to the source voltage. At this time, the microprocessor 201 operates in the test mode, and the microaddress controller 202 selects the output of the incrementer 204. In this way, an operation like that conducted in the previous embodiment is executed.

While some preferred embodiments have been described, the method of test mode switching and the method of acceleration test according to the invention are by no means limitative to those described above.

As has been described in the foregoing, according to the present invention, a majority of internal gates of an LSI under test can be activated substantially in the same situation of operation, in which the LSI under test is used actually, by merely externally supplying a clock and a reset signal to the LSI during the acceleration test. It is thus possible to promote generation of initial failures, improve the efficiency of screening and permit shipment of highly reliable products.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A method of acceleration testing of reliability of an LSI, said LSI having a control memory, a microaddress controller for generating a microaddress and supplying it to said control memory, an incrementer for receiving said microaddress and incrementing it by "1", an input terminal for receiving input signals, and a test signal input terminal for inputting a signal to said microaddress controller thereby to change the LSI to a test mode from a normal mode, said method comprising the steps of:

placing said LSI in an acceleration testing apparatus wherein an acceleration test environment can be externally controlled;

switching an operation mode of the LSI under test to the test mode by applying a signal to said test signal input terminal;

clamping said input terminal of the LSI through a resistor to a power source or to a ground;

supplying the LSI with a source voltage and with a clock signal and a reset signal from a signal generator outside said acceleration testing apparatus; and selecting an output of said incrementer by said microaddress controller while the LSI is set at the test mode.

2. A method of acceleration testing of reliability of an LSI according to claim 1 wherein said LSI has data terminals for receiving data, further comprising a step of clamping said data terminals of the LSI through resistors disposed outside the LSI to the power source or to the ground so that the LSI fetches a specific command code while the acceleration testing is being conducted on the LSI.

3. A method of acceleration testing of reliability of an LSI according to claim 1 wherein said LSI has address output terminals for outputting addresses, further comprising a step of clamping said address output terminals of the LSI through resistors disposed outside the LSI to the ground so that loads are applied to said address output terminals.

4. A method of acceleration testing of reliability of an LSI according to claim 1 wherein said LSI includes a source voltage terminal, further comprising a step of connecting a source voltage terminal of the LSI to the source voltage through a resistor disposed outside the LSI so that a surge voltage is prevented from being applied to the LSI and an excess current is prevented from being applied to the LSI.

* * * * *